United States Patent
Schrage et al.

[15] 3,671,505
[45] *June 20, 1972

[54] SUSPENSION POLYMERIZATION METHOD FOR PREPARING ELASTOMERIC HYDROCARBON INTERPOLYMERS

[72] Inventors: Albert Schrage, East Orange; Jules Ernest Schoenberg, Bergenfield, both of N.J.

[73] Assignee: Dart Industries Inc., Los Angeles, Calif.

[*] Notice: The portion of the term of this patent subsequent to July 21, 1987, has been disclaimed.

[22] Filed: June 27, 1968

[21] Appl. No.: 740,692

[52] U.S. Cl. ............................260/80.78, 260/88.2 R
[51] Int. Cl. ................................C08f 15/04, C08f 15/40
[58] Field of Search............260/94.9, 88.2 B, 80.78, 88.2 R, 260/88.2 D

[56] References Cited

UNITED STATES PATENTS

| | | | |
|---|---|---|---|
| 3,205,216 | 9/1965 | McManimie | 260/94.9 |
| 3,225,021 | 12/1965 | Erchak | 260/93.7 |
| 3,326,883 | 6/1967 | Kelley | 260/94.9 |
| 3,520,859 | 7/1970 | Schrage et al | 260/882. D |

OTHER PUBLICATIONS

Encyclopedia of Polymer Science and Technology Vol. 3; pp. 833– 834, 838, 852– 854 and 856; " Cohesive-Energy Density;" Interscience Publishers; New York (1966) TP 156.P6 E6

Primary Examiner—Joseph L. Schofer
Assistant Examiner—A. Holler
Attorney—Fred S. Valles, Richard A. Dannells, Jr. and Robert P. Whipple

[57] ABSTRACT

A process is provided for preparing ethylene-propylene-diene terpolymers in suspension employing a normally liquid hydrocarbon such as cyclohexane and liquid propylene, the amount of liquid hydrocarbon ranging from 10 to 50 percent by volume and liquid propylene ranging from 50 to 90 percent by volume, this polymerization system resulting in no reactor fouling.

10 Claims, 1 Drawing Figure

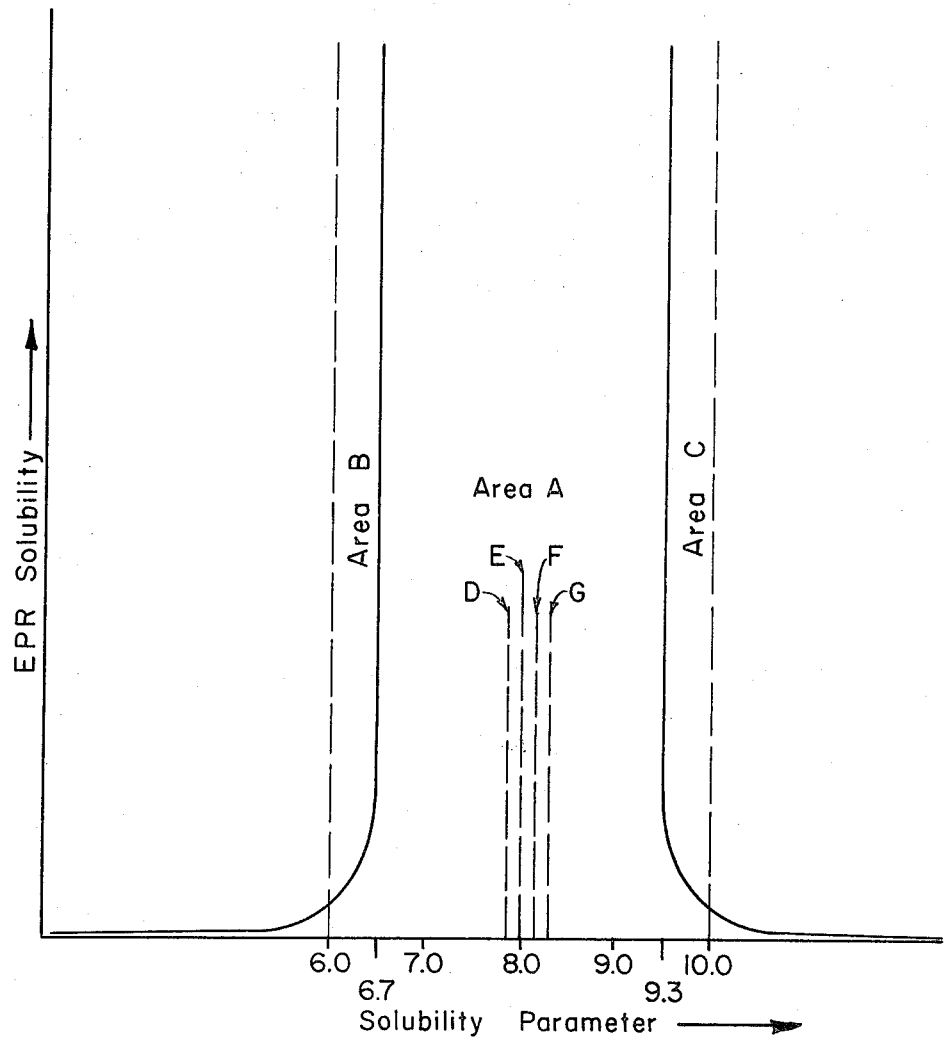
ALBERT SCHRAGE
JULES E. SCHONBERG
INVENTORS
BY Fred S. Valles
ATTORNEY

SUSPENSION POLYMERIZATION METHOD FOR PREPARING ELASTOMERIC HYDROCARBON INTERPOLYMERS

FIELD OF INVENTION

This invention relates to a suspension polymerization method for preparing linear synthetic elastomeric interpolymers. The invention relates more specifically to an improvement in a method for preparing linear synthetic elastomeric interpolymers by the employment of a transition metal compound activated with an organometallic reducing agent wherein the elastomeric interpolymer is formed in discrete or substantially discrete particle form in a novel suspension polymerization medium with agitation and wherein reactor fouling is substantially eliminated.

PRIOR ART

In the commercial manufacture of linear synthetic elastomeric products from two or more olefinically unsaturated hydrocarbons, it has been taught to employ as a solvent a normally liquid hydrocarbon such as hexane or heptane and to interpolymerize olefinically unsaturated monomers while employing as catalysts transition metal halides such as vanadium or titanium compounds activated with trialkylaluminum compounds or alkyl-aluminum halides and hydrides. Conversion of the olefinic monomers to the interpolymer product in this type of process is usually limited to from 5 to 10 percent total solids due to the formation of a highly viscous phase which is referred to in the art as a rubber cement. The high viscosity of this rubber cement poses certain problems, chiefly, difficulty in agitation, and poor mass transfer leading to polymer inhomogeneity and poor heat transfer properties. The low total solids conversion thus required for low viscosity and easy handling adversely affects production rate and costs of manufacture.

In the above described commercial methods for manufacturing linear synthetic elastomers, the interpolymerization reactions are carried out at temperatures below 45° C, usually below 20° C and frequently at temperatures of about 0° C or below, since some of the more active vanadium catalysts have a longer life at such temperatures. At these polymerization temperatures, therefore, refrigeration is required and this obviously increases the cost of investment. Low polymerization temperatures are also required in some polymerization processes in order to prevent interaction between the catalyst and certain chlorinated diluents which have also been described as useful in the literature.

The recovery of the rubber cement formed in the foregoing manufacturing process usually involves a costly and difficult polymer coagulation step and a concomitant purification step for recovery of the diluent.

In apparent attempts to overcome some of the difficulties inherent in those processes indicated above, the literature reports that prior art workers have prepared elastomeric linear interpolymers in suspension form, for example, by using one of the monomers as the diluent in liquid form. Such a technique for preparing an ethylene-propylene rubber is described in British Pat. No. 898,261. In that patent, the preparation of an ethylene-propylene copolymer elastomer is described carrying out the polymerization employing propylene in the liquid phase at preferred polymerization temperatures of from −10° to −100° C. The employment of liquid propylene as the sole diluent in the preparation of an ethylene-propylene rubber has, however, certain disadvantages such as the requirement of the low temperatures and the fact that such a process has been found to result in heavy reactor fouling, that is, adhesion of insoluble polymer to reactor surfaces, as illustrated in Example 2 of the instant specification.

Another attempt to overcome difficulties inherent in the solution process is the suspension polymerization process conducted in methylene chloride as described in U.K. Pat. No. 925,468. In that patent the preparation of ethylene-propylene diene terpolymer elastomer is described carrying out the polymerization in organohalogen solvents resulting in low molecular weight rubbers, however, because the solvents act as chain transfer agents. Furthermore, for reasons to be discussed below, only low concentrations of propylene can be used in this system giving low polymerization rates and low polymer productivity per weight of catalyst resulting in a high cost process.

STATEMENT OF INVENTION

An object of this invention is to provide an improved process for the manufacture of linear elastomeric interpolymers in a suspension to form discrete rubbery particles.

A further object of this invention is to prepare linear synthetic elastomeric interpolymers in a novel diluent system, which system enables the manufacture of such interpolymers in discrete particle form. A specific object of this invention is the manufacture of ethylene-propylene rubbers, and terpolymers of ethylene-propylene and a third monomer containing multiple unsaturation whereby the disadvantages of the prior art methods of preparing these copolymers and interpolymers such as reactor fouling are substantially eliminated.

Accordingly, an improvement is provided herein in a process for preparing a linear synthetic elastomeric interpolymer wherein propylene and ethylene are interpolymerized with at least one other unsaturated hydrocarbon monomer in the presence of a transition metal compound and an organometallic reducing agent as a catalyst, the said improvement comprising conducting said interpolymerization in a diluent system comprising (a) a normally liquid hydrocarbon in an amount of from 10 to 50 volume percent and (b) liquid propylene monomer in a corresponding amount of from 50 to 90 volume percent of the total liquid diluent system therein, and recovering from said interpolymerization said elastomeric interpolymer in discrete particle form. This invention also encompasses the use of a normally gaseous aliphatic hydrocarbon of from three to five carbon atoms in liquid form and in admixture with normally liquid hydrocarbons as will be illustrated hereinafter. By the term monomers or hydrocarbon monomers containing multiple unsaturation as employed in this specification, it is intended to mean those monomers which are used to impart olefinic unsaturation to elastomeric interpolymers such as ethylene-propylene terpolymers.

The attached drawing, which forms a part of this invention, illustrates in graph form curves which illustrate solubility parameters, typically of the system ethylene-propylene rubber and solvents or diluents of this invention. More will be said about this FIGURE later.

In the process of this invention, the selection of the diluent system is critical. As one component of the diluent system, there is selected a normally liquid hydrocarbon which can be employed in an amount of from 10 to 50, preferably 20 to 30 volume percent and as the second component, preferably a reactive hydrocarbon in liquid form in a corresponding amount of from 50 to 90, preferably 80 to 70 volume percent. Substantially inert normally liquid hydrocarbons can be pentane, hexane, cyclohexane, benzene and many others which will be described hereinafter. It has been found that by the employment of the diluent system above that this system unexpectedly gives small highly swollen polymer particles. The reaction may be continued as a very fluid slurry that can be carried to a solids content of about 15 to 20 percent by weight (1 lb/gal) the rate being limited by cooling capacity. There are certain specific and unique advantages to the process herein and these will be described in more detail later on.

The selection of the normally liquid hydrocarbons herein has been dictated to some extent by the "solubility parameters" of the particular hydrocarbon in point. Solubility parameter is a measure of likeness or compatibility of liquids. Thus, two liquids with similar solubility parameters are, in general, compatible while two liquids with widely differing solubility parameters are, in general, incompatible and probably immiscible. Solubility parameter for a volatile liquid is an empirical determination and can be determined by the solubility parameter formula $\sqrt{\Delta E/V}$ where $\Delta E$ is the molar energy of vaporization in calories to a perfect gas and V is the molar volume in cubic centimeters according to J. H. Hildebrand and R. L. Scott, "The Solubility of Nonelectrolytes," Third Ed. Dover Press, 1964. The solubility parameter of a mixture of miscible liquids is generally the arithmeric average of the individual solubility parameters based on the volume fraction of each.

The solubility parameters of certain normally liquid hydrocarbon diluents at 25° C according to this invention are:

| | |
|---|---|
| neopentane (2,2-dimethylpropane) | 6.117 |
| 2-methylbutane (isopentane) | 6,747 |
| 2,2,4-trimethylpentane (isoctane) | 6.849 |
| 2,2,3-trimethylbutane | 6.942 |
| n-pentane | 7.02 |
| n-hexane | 7.24 |
| n-heptane | 7.42 |
| n-octane | 7.55 |
| n-nonane | 7.648 |
| n-decane | 7.722 |
| methylcyclohexane | 7.82 |
| n-hexadecane | 7.99 |
| cyclooctane, cyclononane, cyclodecane and methyl substituted derivatives—about | 8.0 |
| cyclopentane | 8.10 |
| cyclohexane | 8.18 |
| decalin | 8.30 |
| n-propylbenzene | 8.65 |
| p-xylene | 8.75 |
| m-xylene | 8.80 |
| mesitylene | 8.80 |
| ethylbenzene | 8.80 |
| toluene | 8.91 |
| o-xylene | 9.00 |
| benzene | 9.15 |
| tetralin | 9.50 |

The solubility parameters of normally gaseous hydrocarbons at 25° C according to this invention are:

| | |
|---|---|
| propane | 6.2 |
| isobutane | 6.3 |
| butane | 6.6 |
| neopentane | 6.1 |
| isopentane | 6.7 |

The solubility parameter of propylene is 6.1 and butene-1 is 6.7 while others are known.

The solubility parameters of elastomers is determined differently from those of volatile liquids. Thus, for polymers, the solubility parameters can be obtained from swelling measurements on crosslinked polymers in solvents of varying solubility parameters. An experimental method for such determinations is described by T.J. Dedek and F. Bueche in "Journal of Polymer Science," Part A, Vol. 2, pages 811 to 822 (1964).

In general, the solubility parameter of hydrocarbon elastomeric interpolymers lies in the range of 7.8 to as high as about 8.8 depending on the components of the system. The solubility parameter for an ethylene-propylene rubber containing 53 mole percent ethylene is 7.9, for example. When a third component is added to introduce unsaturation such as a non-conjugated diene, the solubility parameter of the resulting elastomer changes. Thus, with 5% of dicyclopentadiene present in the molecule the solubility parameter is about 8.0, with 10 percent it is about 8.1 and with 15 percent it is around 8.2 (as shown in the drawing attached to which reference has heretofore been made). Solubility parameters are important and in order to understand this concept a little better, reference is again made to the Figure.

The selection of a diluent system for a suspension polymerization process as set forth in this specification, as well as certain of the polymerization conditions, are critical in that the diluent system and certain reaction conditions must be capable of producing a particle form interpolymer with minimum reactor fouling. As an example, the use of butane (solubility parameter 6.6) as the sole diluent in an ethylene- propylene interpolymerization results in the formation of a viscous cement and not discrete particle form rubber. However, where the interpolymerization is carried out in combination with propylene (solubility parameter 6.1) in liquid form and at least 15, preferably 20 percent by volume of said propylene is maintained in liquid form during the entire reaction, then the end result is the production of a particle form elastomer with minimum or no reactor fouling. The reason for these results is not entirely understood, but the operability of the preferred diluent system has nevertheless been established.

Referring to the figure as indicated above, Area A represents the region of complete solubility of rubber in the solvents having solubility parameters in the range of 6.7 through 9.3 as noted on the abscissa of the graph. It will be noted that the solubility parameter of ethylene-propylene rubber is about 8.0. Area B is an area of partial solubility with a solubility parameter range of 6.0 to 6.7 while Area C is another area of partial solubility with a solubility parameter range of 9.3 to 10. In accordance with this invention, it has been found that reactor fouling can be eliminated substantially and the rubber produced in particle form if the solubility parameters of the solvent or diluent system differ from the solubility parameter of the elastomeric system by between 1.3 to 2.0 units but preferably 1.30 to 1.60. Within this range the process eliminates reactor fouling and such is eliminated specifically below the liquid reaction level. Thus in the drawing, the portion of Area B between 6.0 and 6.7 represents an area in which rubbery beads or particles can be obtained in the polymerization reaction. If the solubility parameter of the solvent is maintained in the part of Area B, then the rubbery material will exist in a highly swollen state as it is formed in the mixture (this is verified by taking the finished rubber and shaking it in such a solvent for several hours until equilibrium is reached). Further, not only are the rubber particles in a highly swollen state but they also break up during the reaction into very small pieces and such breaking up occurs either due to the stirring means in the vessel or the polymerization activity within the vessel, or both. One of the unique consequences of the phenomenon above is the result that the rubber particles do not adhere to glass or metal surfaces of the particular container in which the polymerization is being carried out nor do they fuse with each other on standing. The mixture, even if allowed to settle, is essentially dispersable by gentle shaking and this is important since it shows that during the polymerization process the rubber being formed will not coagulate or stick to the vessel walls thereby causing operational difficulties.

Should the solubility parameter of the diluent system exceed that of the rubber on the "C" side area of the Figure by 2.0 units, or be less than that of the rubber on the "B" side area by the same amount then the polymer formed will be completely insoluble and will not swell up or disperse. When polymerization is attempted in such a medium, the rubber that is formed immediately precipitates and it is deposited as a tenaciously adhering coating over the entire reactor surface. In the event that the difference in solubility parameter between diluent and rubber is less than 1.3 units, then the polymer dissolves completely to a highly viscous cement and conditions of solution polymerization prevail.

It is to be noted again referring to the aforementioned FIGURE and U.K. Pat. No. 925,468 which carries out suspension polymerizations in solvents such as methylene chloride that the process is conducted in Area C of the Figure. In this case the solvent, methylene chloride, has a solubility parameter of about 9.7.

Although in principle a suspension polymerization can be conducted in Area C, the system suffers from significant practical disadvantages, for example, the solvents used, the organo-halogen compounds, react in the polymerization to reduce molecular weight and this gives a polymer with undesirably weak physical properties as well as a polymer which cannot be extended with oil and loaded with carbon black to give a low cost compounded rubber. Furthermore, and very importantly, only a very low propylene concentration can be used in this system, otherwise the solubility parameter of the mixture is shifted from area C to area A which converts the suspension polymerization to solution polymerization. A consequence of the allowable low propylene concentration is that low rates of polymerization and low catalyst productivities are obtained resulting in high production costs.

Evidence of the shift to a solution system, that is, that upon increase in propylene concentration the operational area is caused to shift from C to A, is given in page 7 of the cited U.K. patent, lines 31 through 38 which state partially as follows: "As the concentration of hydrocarbon monomers increases the copolymer tends to become partially or completely soluble in reaction medium...."

In the process of this invention, as heretofore noted, the solids conversion, that is, the amount of total solids that can be readily handled is at least 5 to 10 weight percent without encountering any problems and such a percent conversion forms a readily stirrable slurry which does not present any heat transfer problems. Additional advantages will be indicated hereinbelow with respect to this observation.

PREFERRED EMBODIMENTS

In accordance with the above it is preferred to operate in the process herein with a hydrocarbon diluent system which when mixed with substantial amounts of propylene liquid has a solubility parameter in the range of 6.0 to 6.7 units, that is, area "B" in the drawing. Although there are some diluents with solubility parameters above 8.0, such as 9.0 and 9.5, which can be used in accordance with this invention, that is, operation in area C, the more readily available and cheaper hydrocarbons indicated hereinbefore are preferred and as a consequence emphasis has been placed on this technique of interpolymerization.

The effect of the solubility parameter of the system, that is the criticality is readily observed by departure from the preferred solubility parameters indicated above. It will be noted that liquid propylene with a solubility parameter of 6.1 is employed in major quantities herein and that by employing a liquid hydrocarbon the solubility parameter of the system can be raised, depending on the amount of hydrocarbon used, to 6.7 or even higher depending on the solubility parameter of the rubber being made since the solubility parameter of a liquid mixture is the arithmetical average of the solubility parameters of the constituents based on their volumetric proportions. Various diluent systems will be illustrated in the Examples of this invention.

The preferred liquid diluent monomer which of course also enters into the interpolymerization is propylene.

In the discussion above concerning the liquid or gaseous monomers and their solubility parameters, emphasis has been placed on those monomers useful in a two-component elastomeric system such as ethylene-propylene with little or no reference to the use of a third monomer to form terpolymers. When the third monomer in an elastomeric terpolymer is highly reactive, as in the case of dicyclopentadiene and other norbornenes, it is employed in minor amounts, that is in amounts sufficient only to impart unsaturation for sulfur curing (usually in the ranges of about 5 to 10 percent by weight, based on the final product makeup) so that the solubility parameter of the third monomer per se does not substantially affect the combined role of the inert diluent because it is present in a very small proportion. However, the presence of substantial amounts of the third monomer in the rubber can affect the solubility parameter of the rubbery component and take it out of the preferred 1.3 to 2.0 difference in solubility parameter units. When this happens the diluents are adjusted to bring the solubility parameters back to the preferred range. Thus, it has been found that a mixture of normal butane and propylene (in a volume ratio of 70:30) can be used to give a non-fouling suspension polymerization to form ethylene-propylene copolymer and ethylene-propylene terpolymer, the latter containing up to 5 weight percent of diene. (Copending application Ser. No. 521,236 filed Dec. 9, 1965, now U.S. Pat. No. 3,520,859. discloses systems of this type.) However, when this latter figure is exceeded the same suspension polymerization is heavily fouled indicating a shift of the solubility parameter of the rubber to a higher value. This, for example, is indicated in the drawing where Curve E represents an ethylene-propylene terpolymer with 5 weight present diene hydrocarbon as the minor component and the solubility parameter indicated is about 8.0. Upon incorporation, however, of 10 weight percent diene to the ethylene-propylene rubber system, the solubility parameter increases to 8.1 as shown in Curve F while the incorporation of 15 weight percent diene as shown in Curve G increases the solubility parameter of the system to about 8.2. However, the system can be restored to an non-fouling suspension polymerization by the addition of about 10% by volume of benzene which has a solubility parameter of 9.15. The addition of benzene shifts the solubility parameter of the diluent of the diluent mixture to a higher value thereby once again bringing the reaction into area B of the Figure. An example illustrating this concept will be presented hereinbelow.

As can be understood from the above, therefore, systems wherein a normally gaseous paraffinic hydrocarbon such as propane or butane in liquid form is employed for a suspension reaction, the amount of said hydrocarbon employed being from about 15 to 90 volume percent can be modified to give non-fouling suspension polymerization reactions, where such occurs due to the use of higher amounts of diene in a terpolymer, by incorporation of a normally liquid hydrocarbon diluent such as an aromatic hydrocarbon of a solubility parameter of about 9.0 such as benzene. The amount of such normally liquid diluent to be incorporated in such a system should be sufficient only to restore it to a non-fouling type and ranges from about 5 to 15 percent by volume (or higher) of such diluent. Also, as heretofore noted, while percent solids conversion can be from 5 to 15 percent, it is preferred in this system to carry the percent conversion to from 5 to 10 percent to obtain excellent operation.

Interpolymers containing at least three unsaturated hydrocarbon monomers can likewise be prepared according to the process herein. In the instance of interpolymers of the type described herein, a third compound which is an acetylenic hydrocarbon such as acetylene itself or a multiple unsaturated hydrocarbon monomer such as dicyclopentadiene and alkyl derivatives can be incorporated in appropriate amounts to impart unsaturation to the rubbery elastomer as is known in the art. Bridged ring hydrocarbons in general are useful herein specifically those containing one unsaturation in the bridged ring molecule and another unsaturation external thereto. Typical of the third component hydrocarbon monomers are the following:

a. Monocyclic diolefins such as cis, cis-1, 5-cyclooctadiene 1,4-cycloheptadiene b. Polyalkenylcycloalkanes such as trans-1,2-divinylcyclobutane; 1,2,4-trivinylcyclohexane c. Bicyclic dienes such as bicyclo (4.3.0) 3,7-nonadiene; bicyclo (4.2.0.) 2,7-octadiene; bicyclo (3.2.0) 2,6-heptadiene;

d. 2-alkylnorbornadienes having about 8-24 carbon atoms such as 2-methylnorbornadiene, 2-ethylnorbornadiene, 2-propylnorbornadiene and, in general, those norbornadienes in which the alkyl group contains from 1-17 carbon atoms (see U.S. Pat. No. 3,063,973) and e. 5-alkenyl-2-norbornenes such as 5-(1'-butenyl-2-norbornene; 5-(1'-propenyl)-2-norbornene; 5-(2'-butenyl)-2-norbornene; 5-(2'-ethyl-2-butenyl)-2-norbornene and 5-(2'-heptyl-1'-undecenyl)-2-norbornene, etc., and 5-methylene-2-norbornene; 5-ethylidene-2-norbornene;

Ternary interpolymers of ethylene and propylene and in ratios between 3:1 and 1:3 and (i) another alpha-olefin of the formula $CH_2 = CHR$ where R is an alkyl radical containing from 2-8 carbon atoms and is present in an amount of 2 to 20 mole present of the interpolymer; (ii) aliphatic non-conjugated dienes having the structure

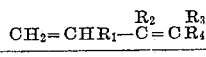

wherein $R_1$ is an alkylene radical, $R_2$, $R_3$ and $R_4$ are selected from the group consisting of H and alkyl, and $R_1$ to $R_4$ are selected so that the diene has from 6 to 22 carbon atoms (see U.S. Patent 3,166,517); e.g., 1,4-hexadiene, 1,6-octadiene, 1,5-hexadiene (see U.S. Pat. No. 2,933,480), etc.

In general, the process of this invention is applicable to the preparation of two, three, four or more component elastomers, that is any of the known elastomeric compositions known to the art. Since this invention is concerned with the process of preparing these compositions and not with novel compositions per se, detail concerning such is known to those skilled in the art.

Any of the well known catalysts for preparing amorphous linear interpolymers known to the art can be employed in the process herein. Such catalysts include the titanium halides such as titanium tetrachloride activated with metallic organic reducing compounds such as trialkylaluminum compounds, alkylaluminum halides and hydrides. Suitable catalysts for the process herein are the vanadium compounds such as $VOCl_3$, $VCl_4$ and vanadium tris(acetylacetonate), alkylchlorovanadates, trialkyl-vanadates such as triethyl vanadate, tri-n-propylvanadate and, in general, any of the catalysts well known in this art including mixtures of these and including adjuvants thereto or additives such as amines. Catalyst concentrations required to carry out any polymerization are necessarily those which are sufficient for initiation purposes and sufficient to perform such economically, suitable examples being offered hereinbelow.

Molecular weight control or desired molecular weight distribution of the product can be effected by varying catalyst component mole ratios or by the use of hydrogen or any other known means to the art.

The polymerization conditions in accordance with the process herein can be varied considerably from those of the prior art. For example, a wider range of polymerization temperatures can be used since heat transfer is not a problem in this process as compared to heat transfer during polymerization and processing of a viscous cement.

The general polymerization procedure is carried out as follows: A reactor is flushed with ethylene and pressured with ethylene to 90 psig. The reactor is then charged with 0.25 ml of diethylaluminum monochloride (DEAC) and propylene and the solvents are charged in appropriate ratios such as: hexane 27% — propylene 73%; cyclohexane 25% — propylene 75%; benzene 20% — propylene 80%. For the amount of DEAC indicated above the reactor is charged with 700 ml of diluent, that is propylene and solvent, and about 4.5 ml of diene monomer such as methyldicyclopentadiene (for an Iodine Number of about 10). The reactor contents are then brought to 22°C with stirring and a 0.029 molar solution of $VCl_4$ in hexane is used. The $VCl_4$ addition is begun along with diene (as a 30% solution in hexane or other solvent) and monomer gas feed (55 mole percent ethylene and 45 mole percent propylene). The pressure is maintained constant at about 130 psig by adjustment of gaseous monomer feed. The $VCl_4$ solution and diene solution feed rates are each about 0.4 ml/minute. The gaseous monomer feed rate is about 1.0 gram/minute. The diene feed is varied according to the gaseous monomer flow so that approximately 0.06 gram of pure diene is added per gram of ethylene plus propylene polymerized which corresponds to an Iodine Number of 10. The final Al:V ratio is preferably kept above 10. The reaction is run for about 30 minutes at which time $VCl_4$ addition and diene addition are stopped. The polymerization dies off in about 15 minutes and isopropanol is added.

As hereinbefore noted in the process of this invention, the mono-olefins comprise a major proportion of the reactants which preferably range from 85 to 95 percent by weight, the remainder consisting of a third monomer when terpolymers are prepared. Generally, the mono-olefins are incorporated in equimolecular proportions, but variations are permissible as long as an amorphous elastomeric product is the result of such a polymerization.

The elastomers formed from only two alpha-olefins as is known in the art can be crosslinked with peroxides or with peroxides plus sulfur and the resulting vulcanizates have excellent elongation and tensile strength.

The elastomers prepared according to the process of this invention containing olefinic unsaturation have vulcanizing properties similar to those of natural rubber. The olefinic unsaturation of these interpolymers is expressed by an "iodine" number (ICl absorbed expressed as grams of iodine absorbed per 100 grams of rubber) which is an indication of adequate curability and can range from at least 3 to not more than 50, preferably 5 to 20 (determined according to the method described by T.S. Lee, I.M. Kolthoff and Ethel Johnson, "Analytical Chemistry," Vol. 22, pages 995 to 1001 (1950.). These interpolymers have intrinsic viscosities (defined and determined according ASTM D-1601-61) in Decalin at 135° C of between 0.5 and 7.0 and contain from about 1 to 15, preferably 1 to 4 mole percent of a multiple unsaturated hydrocarbon interpolymerized usually with an alpha-olefin pair such as ethylene and propylene.

The Mooney viscosity of the products of the process of this invention can range from 20 to 150, preferably 30 to 90, as determined with a Mooney viscometer at 212° F (ML–4) in accordance with ASTM D–927–55T.

The polymerization procedure in cyclohexane or benzene to specifically demonstrate diluents is carried out as follows:

The polymerization is carried out in a 2.5 l glass autoclave equipped with a magnetic stirrer assembly and a coil of steel tubing suspended in the vapor phase to provide reflux cooling. The reactor is flushed with ethylene and pressurized to 90 psig with ethylene and then to 92 psig with hydrogen. The reactor is then charged with 190 ml of cyclohexane, 0.17 ml of diethylaluminum chloride, 3.8 ml of methyldicyclopentadiene (the diene used to impart unsaturation in the rubber) and 400 ml of propylene. Stirring is begun and the temperature is brought to 20° C. Additional ethylene is added to bring the pressure to 148 psig. The terpolymerization is started by feeding a 0.0134 M solution of $VCl_4$ in hexane. Gaseous ethylene, liquid propylene, liquid diene (as a 50 percent by volume solution in n-hexane) and diethylaluminum chloride (as a 3.5 percent by volume solution in n-hexane) are fed to the reactor at rates calculated to keep the diethylaluminum chloride concentration and the monomer ratios constant. The initial solvent mixture has a solubility parameter of about 6.85 and the rubber dissolves to form a viscous cement. Excess propylene over that polymerized is fed into the reactor and so the solubility parameter of the diluent drops until the rubber precipitates to form a suspension at which point the mediums undergo a sudden decrease in viscosity. Keeping the reaction medium somewhat viscous as in the above procedure prevents the rubber from adhering to protuberances such as thermocouples in the reactor and thus prevents fouling.

The reaction is stopped after 81 minutes by the addition of a solution containing 1 gm. of 2,6-di-t-butyl-4-methylphenol ('-'Ionol") in 5 ml. of isopropyl alcohol. At this stage the slurry contains 16 percent by weight of solids and the diluent contains 18% by volume of cyclohexane which corresponds to a solubility parameter of about 6.56. Deionized water (500 ml) is added to the reactor and the mixture is stirred for one hour. The water is removed through a ¼-inch stainless steel dip tube that is immersed near the bottom of the reactor and the slurry is given three rinses in the above manner with 500 ml of water per rinse. The rubber is recovered and vacuum dried. The results of the polymerization are summarized below:

| | |
|---|---|
| Diene feed | 0.13 ml/min. |
| Propylene feed | 5.1 ml/min. |
| Diethylaluminum chloride feed | $1.3 \times 10^{-3}$ ml/min. |

| | |
|---|---|
| $VCl_4$ feed | $1.4 \times 10^{-3}$ mmole/min. |
| Yield | 108 g. |
| Productivity | 4480 g. rubber/g. · $VCl_4$ |
| Inherent viscosity | 3.7 |
| Iodine Number | 9.1 |
| Mole % ethylene in polymer | 83 |
| % gel | 3.0 |
| Vanadium content | 30 ppm |
| Aluminum content | 158 ppm |

The above procedure gives small highly swollen polymer particles at the start of the polymerization. After about 3 percent by weight of polymer has been formed, the reaction becomes viscous and additional propylene is added, which causes the particles to enlarge and harden, and results in a very fluid slurry that can be carried to a solids content of about 15-20 percent by weight (1 lbs./gal.) in about two hours, the rate being limited by cooling capacity. Propylene is added during the reaction, about 400 ml. being added in about two hours. With the benzene/propylene system, the starting benzene concentration is 27% and the final concentration is about 19%. The comparable values for cyclohexane are close, 31% and 21%.

The following examples illustrate this invention with more particularity.

EXAMPLE 1

Prior Art

Preparation of Ethylene-Propylene-Dicyclopentadiene Terpolymer by Solution Polymerization in n-Heptane This example illustrates the preparation of an amorphous ethylene-propylene-dicyclopentadiene terpolymer by a conventional solution polymerization in n-heptane.

A 1.5 liter stainless steel stirred autoclave was charged, under an argon atmosphere, with 600 ml of dry n-heptane, 200 ml of liquid propylene, 8.6 g. of ethylene and 1.0 ml (8.8 millimoles) of ethylaluminum sesquichloride. The reactor was heated to and maintained at 45° C and 7 ml of a 0.075 M (0.52 millimoles) solution of $VOCl_3$ in n-heptane and 11 ml of a 15 volume percent solution of dicyclopentadiene in n-heptane were added over a 21 minute period. During the polymerization, the reactor pressure was maintained at 108 psig by the addition of a monomer mixture containing 56 mole percent ethylene and 44 mole present propylene. The reaction was continued for an additional nine minutes and then 20 ml of a 5 percent solution of "Ionol" in isopropanol was added to deactivate the catalyst. A clear viscous solution was obtained. The terpolymer was precipitated in a Waring blender with 1 liter of isopropanol containing 2.0 g. of "Ionol." The rubber was washed with the isopropanol-stabilizer mixture and vacuum dried.

| | |
|---|---|
| Yield | 29 grams |
| Inherent Viscosity (decalin at 135°C) | 2.9 |
| Percent Insoluble in Cyclohexane at Room Temperature | 0.2 |
| Iodine Number | 5.1 |

The terpolymer prepared in accordance with this Example formed as a viscous cement as indicated and the conversion was low.

EXAMPLE 2

Prior Art

Preparation of Ethylene-Propylene Copolymer By Suspension Polymerization in Liquid Propylene This Example illustrates the preparation of an amorphous ethylene-propylene copolymer by a suspension polymerization in liquid propylene.

A 1.5 liter "Teflon" lined stirred autoclave was charged with 500 ml of liquid propylene, 13.4 g. of ethylene and 1.0 ml (8.8 millimoles) of ethylaluminum sesquichloride. The temperature was set at 25° C and 4 ml of 0.036 M (0.14 millimoles) solution of $VOCl_3$ in n-pentane was added over a 25 minute period while the pressure was maintained between 170-185 psig with the addition of ethylene. The reaction was continued for an additional 7 minutes, after which 500 ml of isopropanol was added. The product consisted of large rubbery beads. However, a thick layer of rubber was attached to the "Teflon" coating. The product was washed with an Ionol-isopropanol mixture (2.0 g. Ionol/l) and vacuum dried.

| | |
|---|---|
| Yield | 32 grams |
| Inherent Viscosity (decalin at 135°C) | 6.8 |
| Percent Insoluble in Cyclohexane at Room Temperature | 0 |

EXAMPLE 3

The reactor in this Example was flushed with ethylene and pressured with ethylene to 90 psig. The reactor was then charged with 0.25 ml of DEAC, 183 ml of cyclohexane and 550 ml of propylene, or with 150 ml of benzene and 600 ml of propylene or with 200 ml of hexane and 525 ml of propylene. Methyldicyclopentadiene (2.2 to 7.4 ml) was then added and the reactor contents brought to 22° C with stirring. A 0.029M solution of $VCl_4$ in hexane was used as the catalyst and $VCl_4$ addition was begun along with diene (as a 30 percent solution in hexane) and monomer feed gas (55 mole percent $C_2$ and 45 mole percent $C_3$). The equilibrium reaction pressure was about 130 psig and the pressure was maintained constant during the reaction by adjustment of gaseous monomer feed. The $VCl_4$ solution and diene solution feed rates were each about 0.4 ml/min. The gaseous monomer feed rate was about 1.0 gram/min. The diene feed was varied according to the gaseous monomer feed so that approximately 0.06 to 0.15 g of pure diene was added per gram of ethylene plus propylene polymerized which corresponds to an Iodine Number of 10 to 25. The final Al/V ratio was kept above 10. The reaction was run for about 30 minutes at which time $VCl_4$ addition and diene addition were stopped. The polymerization died off after about 15 minutes and isopropanol was added.

Table I below illustrates a series of runs carried out in accordance with the above.

TABLE I.—POLYMERIZATIONS IN LIQUID HYDROCARBONS

| Run Number | Solvent | Percent gel | Iodine number | IV | $H_2$ | $H_2$ pressure, p.s.i. | Catalyst productivity g./g. $VCl_4$ |
|---|---|---|---|---|---|---|---|
| 1 | Hexane | 1.9 | 7.5 | 2.20 | Yes | 1.0 | 1,000 |
| 2 | do | 1.6 | 9.7 | 2.71 | Yes | 1.0 | |
| 3 | do | 0.7 | 13.6 | 2.84 | Yes | 1.0 | |
| 4 | do | 3.1 | 11.7 | 2.24 | Yes | 0.5 | 850 |
| 5 | do | 4.8 | 17.1 | 3.80 | No | | 630 |
| 6 | do | 2.6 | 0 | 5.80 | No | | 2,780 |
| 7 | Cyclohexane | 1.1 | 6.8 | 3.35 | Yes | 1.0 | |
| 8 | do | 0.8 | 16.2 | 3.41 | Yes | 0.5 | |
| 9 | do | 1.1 | 6.3 | 2.36 | Yes | 0.5 | 1,520 |
| 10 | Benzene | 0.4 | 8.3 | 3.37 | No | | |
| 11 | do | 1.3 | 12.6 | 4.11 | No | | |
| 12 | do | 2.2 | 4.5 | 3.29 | Yes | 0.5 | 910 |
| 13 | do | 0.7 | 10.6 | 3.04 | Yes | 0.5 | |

In the above Table I in all of the runs the polymer was recovered in slurry form and no difficulty was encountered with respect to fouling below the liquid level.

The resulting fluid slurries from the polymerization above can easily be cooled by refluxing of the propylene. The molecular weight as shown, gel content, catalyst productivity and unsaturation (diene reactivity) are the same for both cyclohexane and benzene. Cyclohexane is presently the preferred diluent for the process of this invention.

The next three Examples illustrate that small changes in the solubility parameter of the polymer and the diluent can have a pronounced effect on the polymerization.

EXAMPLE 4

Preparation of Ethylene-Propylene-Diene Terpolymer by Suspension Polymerization in Butane-Propylene Mixture A 2.5 liter stirred glass autoclave was flushed with ethylene and pressurized with ethylene to 55 psig. The reactor was then charged with 1,050 ml of n-butane, 450 ml of propylene, 0.53 ml of diethylaluminum chloride and 7.8 ml of methyldicyclopentadiene. Stirring was begun, the temperature was lowered to 21° C and the polymerization started by feeding a 0.028 M solution of $VCl_4$ in n-hexane. The monomer concentrations were held constant by maintaining constant reactor pressure with a gaseous ethylene (55 mole percent)-propylene feed mixture and by feeding a 42 percent by volume mixture of methyldicyclopentadiene in n-hexane. Towards the end of the polymerization the rubber plated out onto the reactor surfaces. The solubility parameter of the diluent was approximately 6.46. The $VCl_4$ feed was stopped after 42 minutes of reaction time and the monomer feeds were stopped after 52 minutes. The diluent was displaced with a 0.2 percent solution of 2,6-di-t-butyl-4-methylphenol in isopropyl alcohol. The rubber was washed with fresh iso-propyl alcohol-antioxidant mixture and vacuum dried at 35°C.

The rubber was found to have an Iodine Number of 21.2. When an ethylene-propylene-diene terpolymer was prepared under identical conditions but with an Iodine Number of 10, a non-fouling suspension polymerization resulted. This indicates that the diene shifts the solubility parameter of ethylene-propylene rubber to a higher value.

EXAMPLE 5

Preparation of Ethylene-Propylene-Diene Terpolymer by Suspension Polymerization in a Butane-Propylene-Benzene Mixture The procedure for this Example is substantially the same as in Example 3 except that the diluent consisted of 620 ml of n-butane, 300 ml of propylene and 80 ml of benzene. A non-fouling suspension polymerization resulted. The solubility parameter of the diluent was approximately 6.66.

EXAMPLE 6

Preparation of Ethylene-Propylene-Diene Terpolymer by Solution Polymerization in a Butane-Propylene-Benzene Mixture The procedure for this Example is substantially the same as in Example 3 except that the diluent consisted of 830 ml of n-butane, 400 ml of propylene and 160 ml of benzene. A viscous cement formed. The solubility parameter of the diluent was approximately 6.76. A comparison of Example 4, 5 and 6 shows that the substitution of increasingly larger amounts of butane by benzene progressively raises the solubility parameter of the system from a region of insolubility where heavy fouling occurs to a region which is optimum for suspension polymerization and finally to a region where complete solution occurs.

The results of Examples 4, 5 and 6 are summarized in the Table below.

TABLE II

| Example | 4 | 5 | 6 |
|---|---|---|---|
| $VCl_4$ feed (mmole/min.) | $6.1 \times 10^{-3}$ | $2.9 \times 10^{-3}$ | $7.2 \times 10^{-3}$ |
| Diene feed (ml./min.) | 0.13 | 0.098 | 0.084 |
| Ethylene-propylene feed (l./min.) | 1.1 | 0.82 | 0.94 |
| Yield (g.) | 73 | 20 | 60 |
| Productivity (g. polymer/g. $VCl_4$) | 1000 | 1610 | 680 |
| Inherent viscosity | 2.7 | 3.7 | 2.6 |
| Iodine number | 21.2 | 19.0 | 14.8 |
| Percent gel | 1.6 | 3.0 | 2.5 |

In accordance with this invention, it has been found possible to raise the catalyst productivity by raising the partial pressure of ethylene in the diluent system. In reactions run to about the 5 weight percent solids level, a productivity of about 10,000–12,000 was reached before encountering crystallinity.

It is seen therefore that the system herein possesses certain out-stand advantages.

The following are particular advantages of the process of this invention:

1. Low viscosity leading to faster production rate, high reactor throughput and better quality through:
   a. Fast heat transfer by reflux cooling or cooling coils in liquid
   b. Fast mass transfer ($H_2$ gas and ethylene gas are readily dispersible in liquid)
   c. Easier stirring leading to better homogeneity with respect to polymer composition and molecular weight (small amounts of catalyst and diene are readily stirred into the reaction).
2. High solids level leading to lower production costs through:
   a. Less recycling of monomers and solvent
   b. Increased plant capacity
3. Lower costs through:
   a. Lower catalyst cost (high catalyst productivity)
   b. Easier removal of catalyst residue (less to remove)

High catalyst productivity of non-crystalline polymer is not possible in the solution polymerization process for the following reasons. High productivity is achieved by using high ethylene partial pressures (about 40-50 psi) but this leads to a polymer rich in ethylene and eventually to undesirable crystallinity if the ethylene content of the polymer is greater than about 85 mole percent. In order to stay below 85% but still enjoy the high productivity from high ethylene pressure the reaction system must contain a much larger amount of propylene than can be present in the solution process.

Although the process hereinabove has been described with reference to particular or preferred embodiments, it is obvious that modifications within the scope of this invention can be made. Thus, the normally liquid hydrocarbons can be used in mixtures without detrimental results. Other modifications will occur to those skilled in this art.

What is claimed is:

1. In a process for preparing a linear synthetic elastomeric interpolymer which comprises interpolymerizing propylene and ethylene or propylene, ethylene and a hydrocarbon monomer containing multiple unsaturation in the presence of a transition metal compound and an organometallic reducing agent, the improvement which comprises conducting the interpolymerization in suspension in a diluent system having a solubility parameter which differs from the solubility parameter of the elastomeric interpolymer by 1.3 to 2.0 units, said diluent system comprising (a) 50 to 90 volume percent of liquid propylene and (b) 10 to 50 volume percent of at least one normally liquid hydrocarbon; whereby reactor fouling is reduced and said elastomeric interpolymer may be recovered in discrete particle form.

2. A process according to claim 1 wherein the solubility parameter of the diluent system differs from the solubility parameter of the elastomeric hydrocarbon by 1.3 to 1.6 units.

3. A process according to claim 1 wherein the diluent system comprises (a) 70 to 80 volume percent of liquid propylene and (b) 20 to 30 volume percent of a normally liquid hydrocarbon.

4. In a process for preparing a linear synthetic elastomeric interpolymer which comprises interpolymerizing propylene and ethylene or propylene, ethylene and a non-conjugated hydrocarbon containing multiple unsaturation in the presence of a vanadium catalyst and an organometallic reducing agent, the improvement which comprises conducting the interpolymerization in suspension in a diluent system having a solubility parameter which differs from the solubility parameter of the elastomeric interpolymer by 1.3 to 2.0 units, said diluent system comprising (a) 50 to 90 volume percent of liquid propylene and (b) 10 to 50 volume percent of at least one normally liquid hydrocarbon; whereby reactor fouling is reduced and said elastomeric interpolymer may be recovered in discrete particle form.

5. A process according to claim 4 wherein the normally liquid hydrocarbon is neopentane; 2-methylbutane; isooctane; 2,2,3-trimethylbutane; n-pentane; n-hexane; n-heptane; n-octane; n-nonane; n-decane; methylcyclohexane; n-hexadecane; cyclooctane; cyclononane; cyclodecane; cyclopentane; cyclohexane; decalin; n-propyl benzene; p-xylene; m-xylene; mesitylene; ethylbenzene; toluene; o-xylene; benzene and tetralin.

6. A process according to claim 4 wherein the solubility parameter of the diluent system differs from the solubility parameter of the elastomeric interpolymer by 1.3 to 1.6 units.

7. A process according to claim 4 wherein ethylene, propylene and a non-conjugated hydrocarbon having multiple unsaturation is interpolymerized.

8. A process according to claim 7 wherein the normally liquid hydrocarbon is benzene, hexane or mixtures thereof.

9. A process according to claim 4 wherein ethylene and propylene are interpolymerized.

10. A process according to claim 9 wherein the normally liquid hydrocarbon is hexane, benzene, or cyclohexane.

* * * * *